3,677,934
PROCESS FOR PREPARING PURIFIED LINEAR ALKYLATE BOTTOM

Kanji Majima and Goro Morita, Wakayama-shi, Japan, assignors to Kao Soap Co., Ltd., Tokyo, Japan
No Drawing. Filed Mar. 6, 1969, Ser. No. 804,999
Int. Cl. C10g 21/02
U.S. Cl. 208—323     2 Claims

ABSTRACT OF THE DISCLOSURE

An oil soluble alkylarylsulfonate is prepared by sulfonating a linear alkylate bottom with either (a) 1.2—2 moles of $SO_3$, or
(b) 3—10 moles of fuming sulfuric acid per one mole of the linear alkylate bottom based on the average molecular weight thereof. The reaction mixture is then dissolved in a mineral oil, is washed with sulfuric acid and then is neutralized.

A linear alkylate bottom is treated to remove highly unsaturated hydrocarbons by dissolving the linear alkylate bottom in a nonpolar solvent and then subjecting the resulting solution to countercurrent extraction using a polar solvent.

BACKGROUND OF THE INVENTION

Field of the invention

The present invention relates to a process for preparing a purified linear alkylate bottom, suitable for sulfonation, from detergent alkylate residual oils (or bottom oil).

More particularly, the present invention relates to a process for obtaining a sulfonateable linear alkylate bottom from high temperature fractions of distillate or residual oils (herein referred to as linear alkylate bottoms) which are by-produced in the preparation of linear detergent alkylates.

DESCRIPTION OF THE PRIOR ART

The utilization of salts of sulfonated compounds of alkylate bottoms as an additive for internal combustion engine oils is known. However, those alkylate bottoms are by-products formed in the preparation of detergent alkylates from an olefin having a branched chain, such as propylene tetramer, and benzene. They not only contain monoalkylbenzene and dialkylbenzene but they also contain various complicated by-produced components, because the aluminum chloride or hydrogen fluoride generally used as a catalyst for the arylation of the propylene tetramer also acts as a catalyst for the polymerization, isomerization, depolymerization or disproportionation of the tetramer.

It has been known that the position distribution of alkyl radicals in a dialkylbenzene varies depending on the catalyst used, and that m-dialkylbenzene and p-dialkylbenzene are respectively formed in a larger amount when aluminum chloride and hydrogen fluoride are used, respectively, as the catalyst.

However, the sulfonation of a p-dialkylbenzene in a branched chain alkylate bottom is very difficult, due to its large steric hindrance, while the sulfonation of a monoalkylbenzene and an o- and m-dialkylbenzene in a branched chain alkylate bottom is easy.

An oil soluble sulfonate is required to have a sufficient hydrophobic property in order to exhibit excellent properties, such as dispersibility, heat stability, etc., in a monaqueous system. Dialkylbenzenes are assumed to be suited for this purpose. However, the desired results have never been obtained with branched chain detergent alkylate bottoms, because the reactivity thereof is influenced by the chemical structures of the components contained therein.

Recently, linear detergent alkylates have been prepared by the arylation of straight chain monochloroalkanes or olefins in the presence of a Friedel-Craft's catalyst. In this reaction, linear alkylate bottoms are obtained as by-products. They are mixtures of hydrocarbons having various degrees of unsaturation and they are mainly composed of di-straight chain alkylbenzenes.

Said di-straight chain alkylbenzenes are mainly comprised of p-substituted dialkylbenzenes which can be sulfonated easily due to their small steric hindrances. However, linear alkylate bottoms contain in addition to dialkylbenzenes, diphenylalkanes, alkylindanes, alkyltetraine and highly unsaturated hydrocarbons which yield polysulfonic acids of high polarity by sulfonation, and therefore the coexistence of them in the sulfonation reaction is undesirable.

The present invention provides a process for removing such useless components from linear alkylate bottoms so as to obtain di-straight chain alkylbenzene sulfonates in a high purity.

Linear alkylate bottoms consist of various components, the amounts of which are influenced by the reaction conditions in the preparation of the detergent alkylates. According to mass spectrometry measurements, the linear alkylate bottoms are mixtures of hydrocarbons having various carbon/hydrogen ratios in their molecules over the range of from $C_nH_{2n-6}$ to $C_nH_{2n-18}$. Among representative compounds having different degrees of unsaturation, those which can be identified by mass spectrometry and infrared spectrometry are considered to be as follows:

$C_nH_{2n-6}$ -------------- Alkylbenzene, dialkylbenzene.
$C_nH_{2n-8}$ -------------- Alkylindane.
$C_nH_{2n-10}$ -------------- Alkylindene.
$C_nH_{2n-12}$ -------------- Alkylnaphthalene.
$C_nH_{2n-14}$ -------------- Diphenylalkane.
$C_nH_{2n-16}$ -------------} Highly unsaturated hydrocar-
$C_nH_{2n-18}$ -------------}  bon.

They each may contain many structural isomers, respectively.

The following table lists the compositions, in percentages by weight, of several different linear alkylate bottoms.

EXAMPLE OF STRAIGHT CHAIN ALKYLATE BOTTOM ANALYSIS [1] (by weight)

| Representative compound | Degree of unsaturation | | | | | | |
|---|---|---|---|---|---|---|---|
| | $C_nH_{2n-6}$ | $C_nH_{2n-8}$ | $C_nH_{2n-10}$ | $C_nH_{2n-12}$ | $C_nH_{2n-14}$ | $C_nH_{2n-16}$ | $C_nH_{2n-18}$ |
| | Mono- and dialkyl benzene | Alkyl tetralin | ([2]) | Alkyl naphthalene | Diphenyl alkane | ([2]) | ([2]) |
| Alkylate bottom: | | | | | | | |
| A | 58.7 | 9.3 | 2.7 | 2.2 | 23.4 | 3.2 | 0.4 |
| B | 30.7 | 6.4 | 8.6 | 0.6 | 53.7 | 5.9 | 1.3 |
| C | 58.8 | 8.9 | 2.4 | 2.4 | 25.1 | 2.7 | 0.5 |
| D | 51.6 | 9.5 | 1.4 | 1.4 | 33.9 | 1.8 | 0.3 |
| E | 29.0 | 16.0 | 2.3 | 2.3 | 42.4 | 5.9 | 1.0 |

[1] According to mass spectrometry.
[2] Other highly unsaturated hydrocarbons.

Sulfonation of a linear alkylate bottom may be effected by using known sulfonating agents. However, in practice, the use of $SO_3$ is desirable. When 1 mole of $SO_3$ is used per 1 mole (based on the average molecular weight) of the linear alkylate bottom, the conversion is around 65 percent by weight. Particularly, the conversion of dialkylbenzene is extremely low.

SUMMARY OF THE INVENTION

It has been found, however, that if $SO_3$ is used in an adequately excess amount, the yields of di-straight chain alkylbenzene sulfonates are increased in the process according to the present invention. The highly unsaturated hydrocarbons will be converted to polysulfonic acids whose solubilities are relatively low in a nonpolar solvent, such as mineral oil, so that the polysulfonic acids can be separated from the oily layer containing the di-straight chain alkylbenzene sulfonates.

As described above, a linear alkylate bottom is comprised of an unsaturated multicomponent system, almost all of the components of which are aromatic compounds. For the concentration of particular components having various aromatic characters, a solvent extraction method as employed in the petroleum refining process might be considered to be applicable. However, the direct application of the known method for separating paraffins and naphthenes from aromatic hydrocarbons will not afford good results.

Further, widely known methods for separating olefins and diolefins from aromatic hydrocarbons have also been found to be not suitable for this purpose.

We have found that the content of the unsaturated components higher than $C_nH_{2n-14}$ inclusive can be reduced by carrying out a countercurrent extraction process wtih a polar solvent on a solution of a liner alkylate bottom dissolved in a nonpolar solvent. The purpose of the present invention can be attained more effectively by sulfonating the resulting concentrated fraction under the above-described sulfonation conditions.

DESCRIPTION OF A PREFERRED EMBODIMENT

Thus, in the sulfonation procedure, from 1.2 moles to 2 moles of $SO_3$, preferably in the form of a mixed gas of a volume ratio of $SO_3$/air=20-3/80-97 (v./v.), is reacted per 1 mole (based on the average molecular weight) of a linear alkylate bottom at a temperature preferably below 80° C. in order to effect the sulfonation of said linear alkylate bottom. The resulting reaction mixture is dissolved in a mineral oil, such as a lubricating oil. The solution is then washed with sulfuric acid, preferably with 80 percent sulfuric acid and is then neutralized in the presence of water. Thereafter, water is removed therefrom and the product is separated by a suitable means, such as filtration. As the neutralizing agent, there may be used oxides, hydroxides or carbonates of metals of Groups II, III and IV of the Periodic Table and higher alkylamines having alkyl radicals containing four or more carbon atoms.

In the above process, if $SO_3$ is used in an amount more than 2 moles, the properties of the product are not further improved very much, but on the other hand, carbonation and coloring are observed.

In case fuming sulfuric acid is used in the sulfonation, $SO_3$ in an amount of 3-10 moles is reacted with 1 mole of a straight chain alkylate bottom at a temperature lower than 80° C. in order to effect the sulfonation thereof, a lubricating oil is added to the reaction mixture, then water is added thereto in such an amount that the free sulfuric acid concentration is made 80 percent and, thus, the aqueous sulfuric acid soluble components are separated in the spent acid. After dissolving the product in a mineral oil, it is neutralized in the presence of water.

In this reaction, if fuming sulfuric acid is used in an amount more than 10 moles per mole of linear alkylate bottom, the properties of the product are not further improved very much, but on the other hand, it causes carbonation.

According to the present invention, in order to carry out the sulfonation reaction more effectively, a countercurrent extraction treatment should be effected prior to the sulfonation process of the alkylate bottom components. The countercurrent extraction treatment can be carried out by using (1) a solvent having a very small polarity, such as an aliphatic hydrocarbon having less than about 10 carbon atoms, which includes n-pentane, n-hexane, 2-methylpentane, 2,2-dimethylbutane, n-octane, 2,5-dimethylhexane, n-nonane and n-decane, and (2) a polar solvent having a small solubility in the alkylate bottom as well as in a low polar solvent, such as phenol or furfural.

According to this aspect of the invention, a linear alkylate bottom is dissolved in a nonpolar solvent, the weight of the solvent being from about 0.5–5 times, preferably 1–3 times, as much as the weight of the linear alkylate bottom. The extraction is effected in a countercurrent extraction tower with a polar solvent, the amount of the polar solvent being from about 1–10 times, preferably 3–5 times, as much as the weight of the linear alkylate bottom. The extraction is carried out at a temperature of 0–150° C. At this time, the linear alkylate bottom is dissolved in the nonpolar solvent, the temperature of the solution is controlled at a predetermined temperature, the solution is fed into the extraction tower and it is contacted with the polar solvent countercurrently. The ratio of both solvents in each stage of the extraction should be determined according to the above-described ratios. The number of the extraction stages should preferably be less than five in order to remarkably reduce the content of the highly unsaturated components.

The thus concentrated alkylate bottom obtained by stripping the nonpolar solvent from the raffinate can be sulfonated by means of the sulfonation process as described above and the sulfonate is obtained as a basic metal salt or an organic amine salt.

The oil soluble sulfonates obtained according to the process of the present invention are particularly effective as additives for a lubricating oil in a known manner.

EXAMPLE 1

One mole of a linear alkylate bottom whose composition is shown in the following Table 1 was reacted with a predetermined amount, as listed in Table 1, of $SO_3$ in the form of a diluted gas of a volume ratio of $SO_3$/air=5/95. The reaction mixture was dissolved in an SAE-50 grade lubricating oil, the amount of the lubricating oil being about one-half the volume of the reaction mixture, and was washed with 80 percent sulfuric acid in an amount equivalent to the volume to the reaction mixture. The oily phase was separated and was neutralized with calcium hydroxide in the presence of water. Water was distilled out. The reaction mixture was then filtered to obtain the sulfonate solution.

The sulfonate in the resulting sulfonate solution in the mineral oil was separated as sulfonic acid and was decomposed. The composition of the resulting hydrocarbon was analyzed and was compared with the original sample with respect to their hydrocarbon compositions. The results are shown in Table 1.

TABLE 1

| Sample | 1 | 2 | 3 | 4 |
|---|---|---|---|---|
| (1) $SO_3$ molar ratio | 1.0 | 1.25 | 1.43 | 1.61 |
| (2) Conversion percent in the sulfonation | | 77.3 | 86.8 | 92.0 |
| Hydrocarbon composition (wt. percent): | | | | |
| $C_nH_{2n-4}$ | 61.8 | 50.2 | 71.5 | 70.0 | 75.3 |
| $C_nH_{2n-8}$ | 13.7 | 17.7 | 20.7 | 15.6 | 18.1 |
| $C_nH_{2n-12}$ | 2.8 | 11.3 | 3.7 | 7.6 | 2.6 |
| $C_nH_{2n-14}$ | 16.0 | 15.8 | 1.3 | 4.4 | 1.4 |
| Remainder | 5.8 | 5.0 | 2.8 | 2.4 | 2.6 |
| Average molecular weight | 357 | 355 | 359 | 364 | 360 |
| Water soluble polar substances in total sulfonates, percent mol | | 13.2 | 11.2 | 6.3 | 8.4 |

EXAMPLE 2

A linear alkylate bottom, the same as that used in Example 1, was dissolved in 2.8 times as much by weight (3.7 times as much by volume) of n-hexane, to which was then added furfural in the same volume as the n-hexane and a countercurrent extraction was effected. Then the same volume of furfural was added to the n-hexane solution layer and the same volume of n-hexane was added to the furfural layer, respectively, and this treatment was repeated to effect the countercurrent extraction ten times.

From each n-hexane layer, n-hexane was removed by distillation. To remove the remaining small amount of furfural, the raffinate was dissolved in petroleum ether and then was passed through a column filled with alumina for chromatography to adsorb it. After the elution with petroleum ether and the removal of the solvent, the yield of pure alkylate bottom of each raffinate is determined. The result was as shown in Table 2.

TABLE 2

| Number of raffinate: | Ratio against starting material |
|---|---|
| 1 | 63.3 |
| 2 | 15.6 |
| 3 | 4.9 |
| 4 | 2.2 |
| 5 | 1.1 |
| 6 | 0.5 |
| 7 | 0.1 |
| 8 | 0.0 |
| 9 | 0.0 |
| 10 | 0.0 |
| Total | 87.7 |

The results of mass spectrometry of the above raffinates 1–5 are as shown in Table 3.

TABLE 3

| Raffinate | $C_nH_{2n-6}$ | $C_nH_{2n-8}$ | $C_nH_{2n-12}$ | $C_nH_{2n-14}$ | Remainder |
|---|---|---|---|---|---|
| Starting material | 61.6 | 13.7 | 2.8 | 12.0 | 5.7 |
| 1 | 78.9 | 1.47 | 1.6 | 2.4 | 2.4 |
| 2 | 56.2 | 18.5 | 4.2 | 14.7 | 6.4 |
| 3 | 23.6 | 14.4 | 7.2 | 46.7 | 8.1 |
| 4 | 7.1 | 6.3 | 8.6 | 67.4 | 10.2 |
| 5 | 2.8 | 2.4 | 9.5 | 71.2 | 14.1 |

EXAMPLE 3

A linear alkylate bottom, having the composition as shown below in Table 4, was dissolved in an equivalent weight of n-octane. Extraction was repeated three times with three times as much by weight of phenol, and the solvent was distilled out from the raffinate layer to obtain the composition as shown in Table 4.

The product (Sulfonate I) was treated in the same manner as in Example 1 with 1 mole of $SO_3$ based on the average molecular weight of pure alkylate bottom to obtain the sulfonate. The sulfonate separated from the reaction product was decomposed, and the composition of the resulting hydrocarbon was determined.

For comparison, the results achieved using a sulfonate (Sulfonate II) obtained by the direct sulfonation (without extraction) of said linear alkylate bottom are also shown in Table 4.

EXAMPLE 4

200 grams (0.54 mole) of a linear alkylate bottom having an average molecular weight of 371 and the following unsaturated components:

|  | Wt. percent |
|---|---|
| $C_nH_{2n-6}$ | 61.9 |
| $C_nH_{2n-8}$ | 13.6 |
| $C_nH_{2n-14}$ | 15.5 |
| $C_nH_{2n-12}$ | 3.0 |
| $C_nH_{2n-10}$ | ⎫ |
| $C_nH_{2n-16}$ | ⎬ 6.1 |
| $C_nH_{2n-18}$ | ⎭ | were sulfonated at a temperature of 25–30° C. with 22 percent fuming sulfuric acid having a total $SO_3$ moles of 1, 2, 5, 10 or 12. After the addition of an SAE–50 grade lubricating oil to the reaction mixture and mixing them, water was added thereto in such an amount that the concentration of the free sulfuric acid was made 80 percent and a lower layer containing spent acid was separated. After neutralization of the upper layer with barium hydroxide in the presence of $\frac{1}{10}$ as much water, by volume, as the sulfonate, water was distilled out and the product was filtered. The content of the water soluble polar substance in the total sulfonates and the amounts of the components corresponding to $C_nH_{2n-14}$ through $C_nH_{2n-18}$ in the hydrocarbons obtained by the decomposition of the sulfonates were as shown in Table 5.

TABLE 5

|  | 1 | 2 | 3 | 4 | 5 |
|---|---|---|---|---|---|
| Alkylate bottom (grams) | 200 | 200 | 200 | 200 | 200 |
| 22% fuming sulfuric acid (grams) | 50.5 | 103 | 252 | 505 | 607 |
| Total $SO_3$/alkylate bottom, molar ratio | 1 | 2 | 5 | 10 | 12 |
| Water soluble polar substance in total sulfonates, mol. percent | 15.4 | 13.5 | 5.6 | 4.2 | 4.1 |
| $C_nH_{2n-14}$–$C_nH_{2n-18}$ in hydrocarbons obtained by the sulfonate decomposition | 25.5 | 22.0 | 4.5 | 3.6 | 3.5 |

EXAMPLE 5

The sulfonates I and II in Example 3 were neutralized with N-dodecylamine to obtain the respective organic amine salts.

The results of a standing test (solubility test) of the paraffinic lubricating oil solutions (10 percent by weight of amine salts) of these samples at room temperature and the determination of the contents of the water soluble polar substance in total sulfonates are shown in the following Table 6.

TABLE 6

|  | Sulfonate I | Sulfonate II |
|---|---|---|
| (a) Turbidity | Transparent after 3 months. | Turbid after 2 weeks. |
| (b) Contents of water soluble polar substances, mol. percent. | 7.4 | 15.5 |

TABLE 4

|  | Starting alkylate | Purified alkylate by extraction | Sulfonate I | Sulfonate II |
|---|---|---|---|---|
| Sulfonation $SO_3$ molar ratio | | | 1.0 | 1.0 |
| Water soluble polar substance in total sulfonates, percent mol | | | 2.3 | 7.5 |
| Composition (wt. percent): | | | | |
| $C_nH_{2n-6}$ | 61.9 | 71.9 | 67.0 | 49.4 |
| $C_nH_{2n-8}$ | 13.6 | 14.4 | 13.4 | 18.1 |
| $C_nH_{2n-12}$ | 3.0 | 2.3 | 9.5 | 11.3 |
| $C_nH_{2n-14}$ | 15.5 | 7.0 | 7.9 | 16.0 |
| Remainder | 6.1 | 3.1 | 2.2 | 5.2 |
| Average molecular weight | 371 | 361 | 373 | 371 |

EXAMPLE 6

A 10 wt. percent solution of the organic amine salt dissolved in paraffinic lubricating oil, obtained by washing the sulfonate obtained in Run No. 4 in Example 1 with sulfuric acid and neutralizing it with N-dodecylamine was transparent after three months at room temperature, and the content of water soluble polar substance in the total sulfonates was 6.8 mol. percent.

The embodiments of the invention in which an exclusive property or privilege is claimed are defined as follows:

1. A process for separating highly unsaturated hydrocarbons from a linear alkylate bottom feed comprising the steps of:

dissolving in a normally liquid alkane having no more than 10 carbon atoms, a linear alkylate bottom, aromatic hydrocarbon feed consisting essentially of a mixture of alkylbenzenes, dialkylbenzenes, alkylindans, alkylindenes, alkylnaphthalenes and diphenyl alkanes and highly unsaturated hydrocarbons to form a solution;

then contacting said solution with a polar solvent selected from the group consisting of phenol and furfural flowing countercurrent thereto in a countercurrent extraction zone, thereby obtaining a raffinate consisting essentially of said alkane having dissolved therein a linear alkylate bottom fraction containing a higher concentration of the less highly unsaturated aromatic hydrocarbons and a low concentration of the more highly unsaturated aromatic hydrocarbons than is contained in said feed, and also obtaining an extract consisting essentially of said polar solvent having dissolved therein the remainder of said feed, then removing said alkane from said raffinate to obtain said linear alkylate bottom fraction.

2. A process according to claim 1, in which the amount of the nonpolar solvent used is from about 0.5–5 times, by weight, based on the weight of the linear alkylate bottom, and the amount of the polar solvent is from about 1–10 times, by weight, based on the weight of the linear alkylate bottom.

References Cited

UNITED STATES PATENTS

| | | | |
|---|---|---|---|
| 2,746,980 | 5/1956 | Bray | 260—505 |
| 3,317,423 | 5/1967 | Hebert | 260—674 |
| 3,476,800 | 11/1969 | Cease | 260—505 |

LEON ZITVER, Primary Examiner

A. SIEGEL, Assistant Examiner

U.S. Cl. X.R.

260—674 A, 674 SE, 505 S